(12) United States Patent
Klodowski

(10) Patent No.: US 8,120,885 B2
(45) Date of Patent: Feb. 21, 2012

(54) CIRCUIT FOR USE WITH ENERGY CONVERTER

(75) Inventor: Anthony Michael Klodowski, Hardy, VA (US)

(73) Assignee: General Electric Company, Schenectady, NY (US)

( * ) Notice: Subject to any disclaimer, the term of this patent is extended or adjusted under 35 U.S.C. 154(b) by 71 days.

(21) Appl. No.: 12/699,606

(22) Filed: Feb. 3, 2010

(65) Prior Publication Data

US 2011/0141637 A1  Jun. 16, 2011

(51) Int. Cl.
    *H02H 9/04* (2006.01)
(52) U.S. Cl. ......................................... 361/91.5
(58) Field of Classification Search ................. 361/91.5
    See application file for complete search history.

(56) References Cited

U.S. PATENT DOCUMENTS

| | | | |
|---|---|---|---|
| 5,426,579 A * | 6/1995 | Paul et al. | 363/126 |
| 7,332,827 B2 | 2/2008 | Nielsen | |
| 7,547,353 B2 * | 6/2009 | Reyes et al. | 96/80 |
| 2005/0116476 A1 | 6/2005 | Feddersen | |
| 2007/0024059 A1 | 2/2007 | D'Atre et al. | |
| 2007/0052244 A1 | 3/2007 | Hudson | |
| 2009/0008937 A1 | 1/2009 | Erdman et al. | |
| 2009/0079191 A1 | 3/2009 | Mari et al. | |
| 2010/0141041 A1 * | 6/2010 | Bose et al. | 307/82 |

FOREIGN PATENT DOCUMENTS

| | | |
|---|---|---|
| EP | 0250719 A2 | 1/1988 |
| EP | 1443634 A2 | 8/2004 |
| WO | 2004040748 A1 | 5/2004 |
| WO | 2006069569 A1 | 7/2006 |

OTHER PUBLICATIONS

Search Report and Written Opinion from corresponding EP Application No. 11152181.1-1242 on Apr. 27, 2011.
Patel, Office Action Communication for U.S. Appl. No. 12/550,585 dated Aug. 1, 2011, 19 pages.

* cited by examiner

*Primary Examiner* — Ronald W Leja
(74) *Attorney, Agent, or Firm* — Ernest G. Cusick; Hoffman Warnick LLC

(57) ABSTRACT

In an embodiment, the circuit includes: a first switch serially connected to a first discharge resistor, the first switch and the first discharge resistor connected to a positive DC bus; a second switch serially connected to a second discharge resistor, the second switch and the second discharge resistor connected to a negative DC bus; and a capacitor bank for storing a positive and a negative DC voltage, the capacitor bank including a first capacitor in parallel with the first switch and the first discharge resistor, and a second capacitor in parallel with the second switch and the second discharge resistor, wherein the first switch operates independently from the second switch to discharge the positive DC voltage through the first discharge resistor and the second switch operates independently from the first switch to discharge the negative DC voltage through the second discharge resistor.

14 Claims, 4 Drawing Sheets

CIRCUIT FOR USE WITH ENERGY CONVERTER

CROSS REFERENCE TO RELATED APPLICATIONS

This patent application relates to commonly-assigned U.S. patent application Ser. No. 12/550,585 entitled "LINE SIDE CROWBAR FOR ENERGY CONVERTER", filed on Aug. 31, 2009.

BACKGROUND OF THE INVENTION

The subject matter disclosed herein relates generally to renewable energy and more particularly to a circuit for use with an energy converter used with a renewable energy-based power unit.

Wind turbines are one type of renewable energy-based power unit that competes with traditional forms of electric power generation. As a result, wind turbines depend on cost effective, reliable as well as safe means to capture wind energy and convert it to electrical energy that is suitable for delivery miles away. In operation, wind turbines have multiple rotating blades connected to a rotor shaft that are turned by the wind. The rotation of the blades by the wind spins the rotor shaft to generate a rotational torque or force that drives one or more generators to convert mechanical energy to electrical energy. The electrical energy generated by the generator is distributed down through the tower to a utility grid via a transformer.

Generally, a medium voltage is used to collect electric power from wind turbines in a typical wind power generation application. An energy converter is used on the generator side or the line side, or both. A 3-level bridge is typically used as a power converter in medium voltage systems. A product requirement for the 3-level bridge converter is that the positive direct current (DC) bus voltage and the negative DC bus voltage remain the same, so that the neutral DC bus is balanced. Furthermore, the positive DC bus voltage and the negative DC bus voltage must be constrained to a maximum operating voltage. If a grid fault occurs, control of neutral DC bus can be temporarily restricted. Also, during a grid fault, or during the recovery after a grid fault, the DC bus voltage may overshoot and exceed the maximum peak operating voltage. Additionally, if a grid fault occurs, net energy can flow in the positive to negative DC buses that must be dissipated.

BRIEF DESCRIPTION OF THE INVENTION

Solutions for dissipating regenerative energy during a grid fault and controlling the DC bus voltages with a circuit are disclosed. In one embodiment, the circuit includes: a first switch serially connected to a first discharge resistor, the first switch and the first discharge resistor connected to a positive DC bus; a second switch serially connected to a second discharge resistor, the second switch and the second discharge resistor connected to a negative DC bus; and a capacitor bank for storing a positive DC voltage and a negative DC voltage, the capacitor bank including a first capacitor in parallel with the first switch and the first discharge resistor, and a second capacitor in parallel with the second switch and the second discharge resistor, wherein the first switch operates independently from the second switch to discharge the positive DC voltage through the first discharge resistor and the second switch operates independently from the first switch to discharge the negative DC voltage through the second discharge resistor.

A first aspect of the invention provides a circuit, comprising: a first switch serially connected to a first discharge resistor, the first switch and the first discharge resistor connected to a positive DC bus; a second switch serially connected to a second discharge resistor, the second switch and the second discharge resistor connected to a negative DC bus; and a capacitor bank for storing a positive DC voltage and a negative DC voltage, the capacitor bank including a first capacitor in parallel with the first switch and the first discharge resistor, and a second capacitor in parallel with the second switch and the second discharge resistor, wherein the first switch operates independently from the second switch to discharge the positive DC voltage through the first discharge resistor and the second switch operates independently from the first switch to discharge the negative DC voltage through the second discharge resistor.

The second aspect of the invention provides a power unit, comprising: at least one energy converter; a transformer configured to transfer electrical energy from the at least one energy converter to an electrical grid; and a circuit coupled to the at least one energy converter, the circuit comprising: a first switch serially connected to a first discharge resistor, the first switch and the first discharge resistor connected to a positive DC bus; a second switch serially connected to a second discharge resistor, the second switch and the second discharge resistor connected to a negative DC bus; and a capacitor bank for storing a positive DC voltage and a negative DC voltage, the capacitor bank including a first capacitor in parallel with the first switch and the first discharge resistor, and a second capacitor in parallel with the second switch and the second discharge resistor, wherein the first switch operates independently from the second switch to discharge the positive DC voltage through the first discharge resistor and the second switch operates independently of the first switch to discharge the negative DC voltage through the second discharge resistor.

The third aspect of the invention provides a wind power unit, comprising: at least one wind turbine that includes a generator; at least one energy converter coupled to the generator of the at least one wind turbine; a transformer configured to transfer electrical energy from the at least one energy converter to an electrical grid; and a circuit coupled to the at least one energy converter, the circuit comprising: a first switch serially connected to a first discharge resistor, the first switch and the first discharge resistor connected to a positive DC bus; a second switch serially connected to a second discharge resistor, the second switch and the second discharge resistor connected to a negative DC bus; and a capacitor bank for storing a positive DC voltage and a negative DC voltage, the capacitor bank including a first capacitor in parallel with the first switch and the first discharge resistor, and a second capacitor in parallel with the second switch and the second discharge resistor, wherein the first switch operates independently of the second switch to discharge the positive DC voltage through the first discharge resistor and the second switch operates independently of the first switch to discharge the negative DC voltage through the second discharge resistor.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide for dissipating regenerative energy and controlling the DC bus voltages during a grid fault. Although the various embodiments of the present invention described herein are directed to using a circuit with a wind turbine, embodiments of the present invention have a wider application of use than with a wind power unit. In particular, embodiments of the present invention are suitable for any power generation unit such as for example a renewable energy-based power unit. An illustrative, but non-exhaustive list of renewable energy-based power units that may be suited for use with the present invention may include solar, battery energy storage systems, water, geothermal, etc. Those skilled in the art would be able to apply the principals of the various embodiments of the present invention to the energy converter used with each of these renewable energy-based power units and the transformer used to distribute the energy to the electrical grid.

Figure 1:
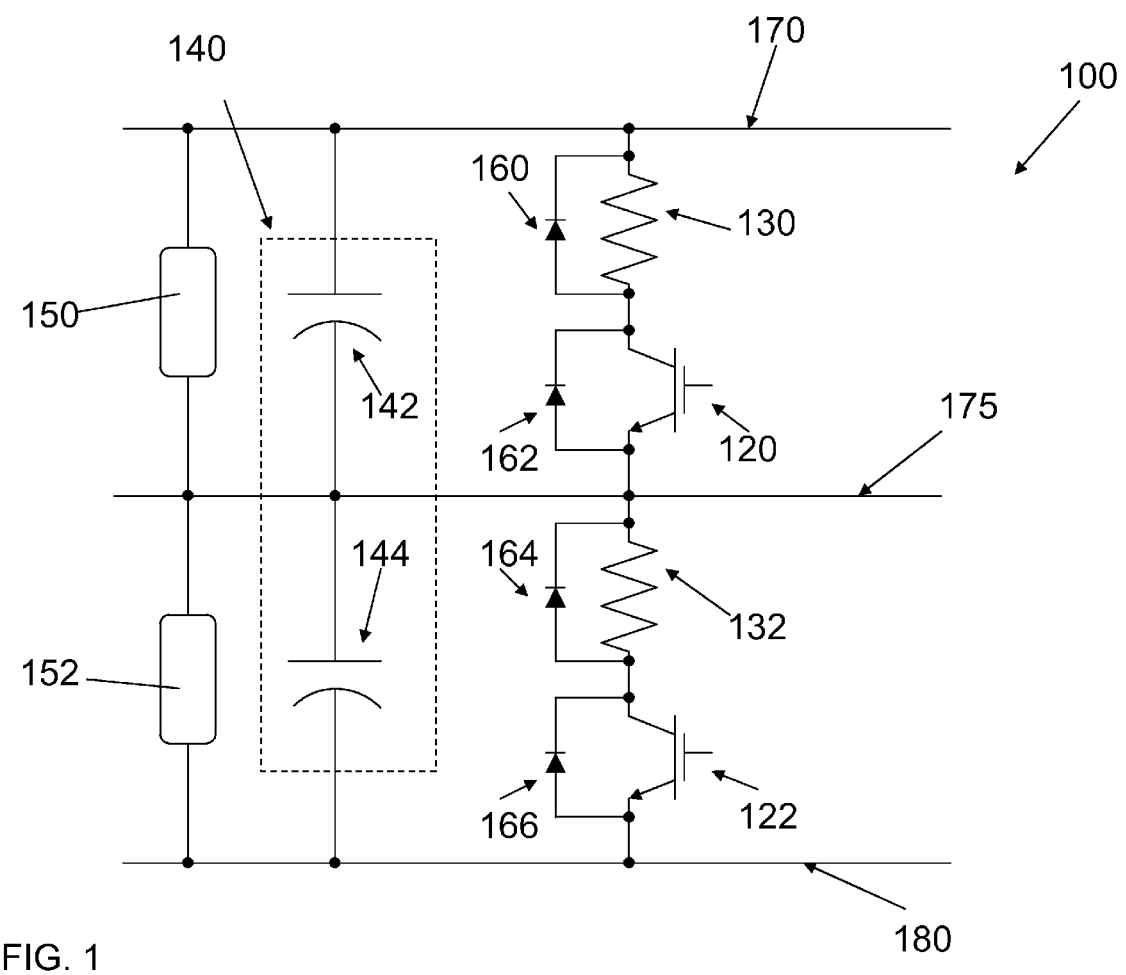
FIG. 1 shows a circuit diagram according to an embodiment of the present invention.

Referring to the drawings, FIG. 1 is a circuit diagram according to an embodiment of the present invention. Circuit 100 is shown including a first switch 120 serially connected to a first discharge resistor 130 and a second switch 122 serially connected to a second discharge resistor 132. First switch 120 and first discharge resistor 130 are connected to a positive DC bus 170. Second switch 122 and second discharge resistor 132 are connected to a negative DC bus 180. Circuit 100 also includes a capacitor bank 140 for storing a positive DC voltage and a negative DC voltage. Capacitor bank 140 includes a first capacitor 142 (including positive DC voltage) in parallel with first switch 120 and first discharge resistor 130. Capacitor bank 140 also includes a second capacitor 144 (including negative DC voltage) in parallel with second switch 122 and second discharge resistor 132. The elements shown as switches, discharge resistors, and capacitors can be built up of smaller devices operated either in parallel or in series to perform a net function of a single larger switch, discharge resistor, or capacitor with higher voltage and/or current rating than the individual components.

First switch 120 and second switch 122 are shown as insulated gate bipolar transistors (IGBT's). However, those skilled in the art will recognize that any now known, or later developed, switching devices may be used in place of the IGBT's. For example, first switch 120 and second switch 122 may also include gate turn-off thyristors (GTO's), integrated gate-commutated thryistors (IGCT's), injection enhanced gate transistors (IEGT's), bipolar transistors, MOSFET's, mos-controlled thyristors (MCT's), and possibly forced commutated silicon-controlled rectifiers (SCR's).

Circuit 100 may include at least one sensing unit, such as sensing unit 150 and sensing unit 152, configured to measure a voltage across first capacitor 142 and second capacitor 144, respectively. During operation of circuit 100, if sensing unit 150 senses an overvoltage across first capacitor 142, first switch 120 operates, independently from second switch 122, to discharge the positive DC voltage. Conversely, if sensing unit 152 senses there is an overvoltage across second capacitor 144, second switch 122 operates, independently from first switch 120, to discharge the negative DC voltage. Furthermore, if both sensing units 150, 152 sense there is an overvoltage across first capacitor 142 and second capacitor 144, first switch 120 and second switch 122 may, independently and simultaneously, operate to discharge the positive DC voltage and the negative DC voltage. Alternatively, if sensing units 150, 152 sense an imbalance between the positive DC bus voltage and the negative DC bus voltage, the switch 120, 122 that is associated with the highest voltage across capacitor 142, 144 turns on to discharge either the positive DC voltage or the negative DC voltage. Also, in the case of an imbalance, both switches 120, 122 may turn on at the same time to discharge the positive DC voltage and the negative DC voltage; however, the switch 120, 122 associated with the highest voltage is turned on for a longer period of time to balance the positive DC voltage and the negative DC voltage.

Figure 2:
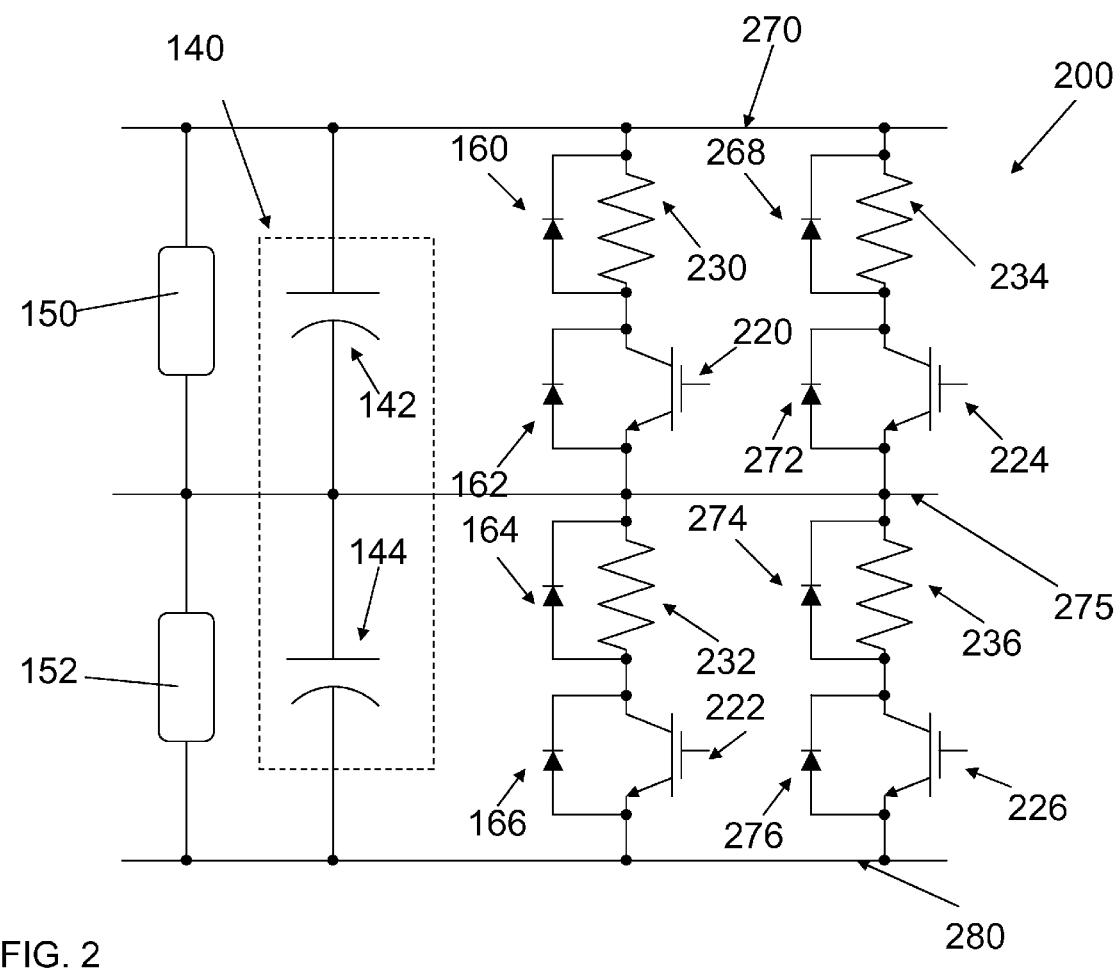
FIG. 2 shows a circuit diagram according to an embodiment of the present invention.

Referring now to FIG. 2, an alternative embodiment of a circuit 200 is shown. Circuit 200 may include (in addition to those features disclosed above with respect to FIG. 1) a plurality of additional switches and a plurality of additional discharge resistors connected to the positive DC bus 270 and the negative DC bus 280. This may allow for the ability to dissipate more power or to control the dissipated power more smoothly. For example, as shown in FIG. 2, circuit 200 includes third switch 224 serially connected to a third discharge resistor 234. Third switch 224 and third discharge resistor 234 are connected to positive DC bus 270 and in parallel with first switch 220 and first discharge resistor 230. Circuit 200 also includes a fourth switch 226 and a fourth discharge resistor 236. Fourth switch 226 and fourth discharge resistor 236 are connected to negative DC bus 280 and in parallel with second switch 222 and second discharge resistor 232. Although FIG. 2 only illustrates circuit 200 to include third switch 224 with third discharge resistor 234 and fourth switch 226 with fourth discharge resistor 236, circuit 200 may include a plurality of additional switches and a plurality of additional discharge resistors that operate independently.

Referring now to FIG. 1, circuit 100 may include a plurality of diodes 160, 162, 164, 166. Alternatively, referring to FIG. 2, circuit 200 may further include a plurality of diodes 268, 272, 274, and 276. In any embodiment, the plurality of diodes may be either normally included in a package as part of a commercially available power device or to control any parasitic effects of the power circuit when the switches turn off. The plurality of diodes 160, 162, 164, 166, 268, 272, 274, and 276 may be connected in parallel to discharge resistors 230, 232, 234, and 236 and in parallel to switches 220, 222, 224, and 226. However, an alternative embodiment may include only the plurality of diodes 160, 164, 268, and 274 connected in parallel to discharge resistors 230, 232, 234, and 236.

Figure 3:
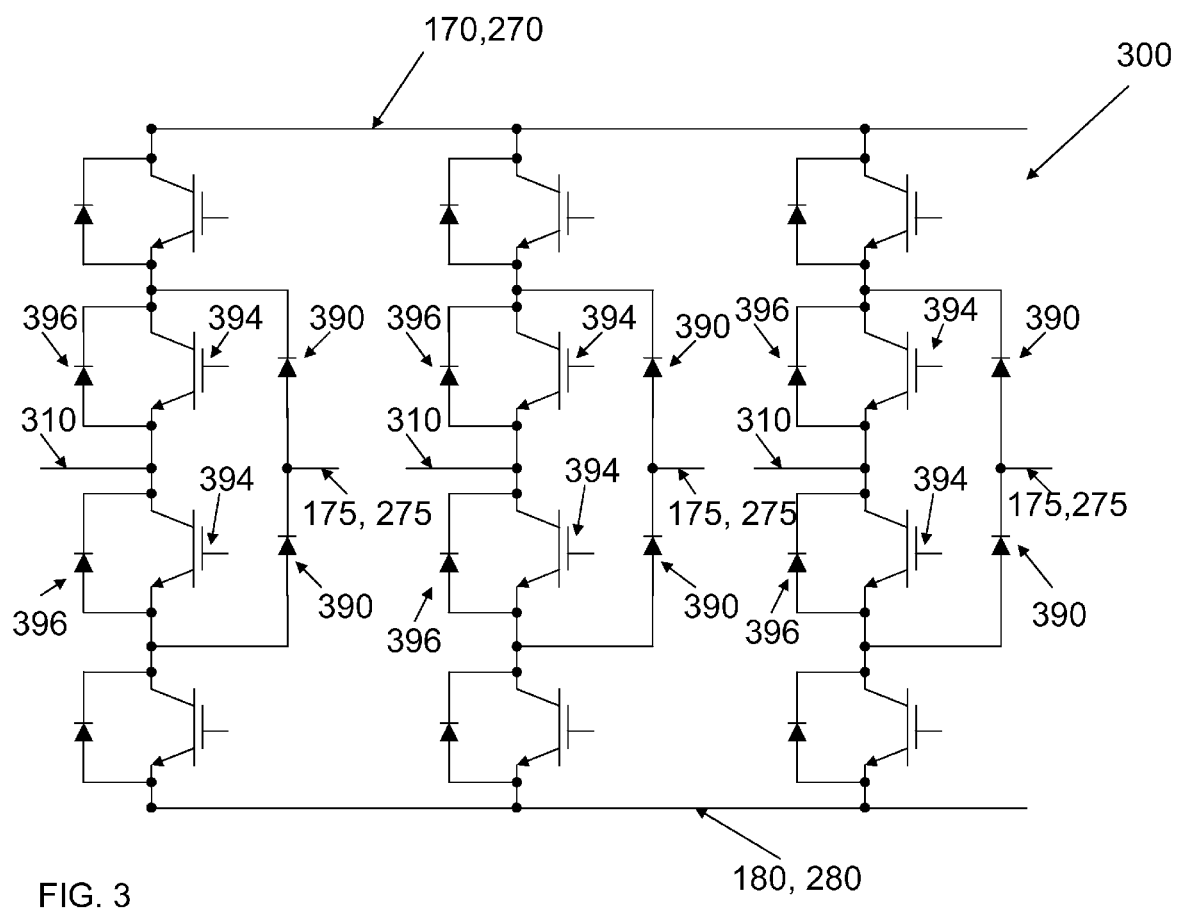
FIG. 3 shows a circuit diagram of an energy converter according to an embodiment of the present invention.

Referring now to FIG. 3, a circuit diagram of an energy converter 300 for use with circuit 100, 200 (FIGS. 1 and 2) according to an embodiment of the present invention is shown. As shown, energy converter 300 is a 3-level converter bridge that includes three series of four IGBT's, with each IGBT in parallel with a diode. 3-level converter bridge 300 is connected to positive DC bus 170, 270, neutral DC bus 175, 275, and negative DC bus 180, 280. The positive DC bus 170, 270, neutral DC bus 175, 275, and negative DC bus 180, 280 of energy converter 300 are the same as positive DC bus 170, 270, neutral DC bus 175, 275, and negative DC bus 180, 280 of circuit 100, 200. Energy converter 300 includes input terminals 310 to connect to a generator 50 (FIG. 4) or a transformer 400 (FIG. 4).

Examples of situations in which an overvoltage may occur are now discussed. One example is that, during a grid fault, energy may still continue to be created by the generator, but will not flow to the electrical grid. In this case, this energy is dissipated through both first discharge resistor 130 and second discharge resistor 132. Another example is, during a grid fault or recovery after a grid fault, the DC bus voltage may spike. First discharge resistor 130 and/or second discharge resistor 132 may be turned on control the voltage until normal grid control is obtained. A grid fault may also cause the positive DC voltage and the negative DC voltage to become imbalanced. However, for proper operation, a 3 level bridge converter requires that these two voltages remain balanced. First discharge resistor 130 or second discharge resistor 132 may be turned on to reduce the imbalance between the positive DC voltage or the negative DC voltage. Also, if certain power devices in a 3-level converter shorted, for example, the inner diodes 396 or inner IGBT's 394 or diodes 390 connected to neutral DC bus 175 (FIG. 3), an overvoltage, known to those skilled in the art as a "voltage doubler" may occur that will cause either first capacitor 142 or second capacitor 144 to charge to approximately twice the normal operating value. First discharge resistor 130 or second discharge resistor 132 may be turned on to control the overvoltage.

Figure 4:
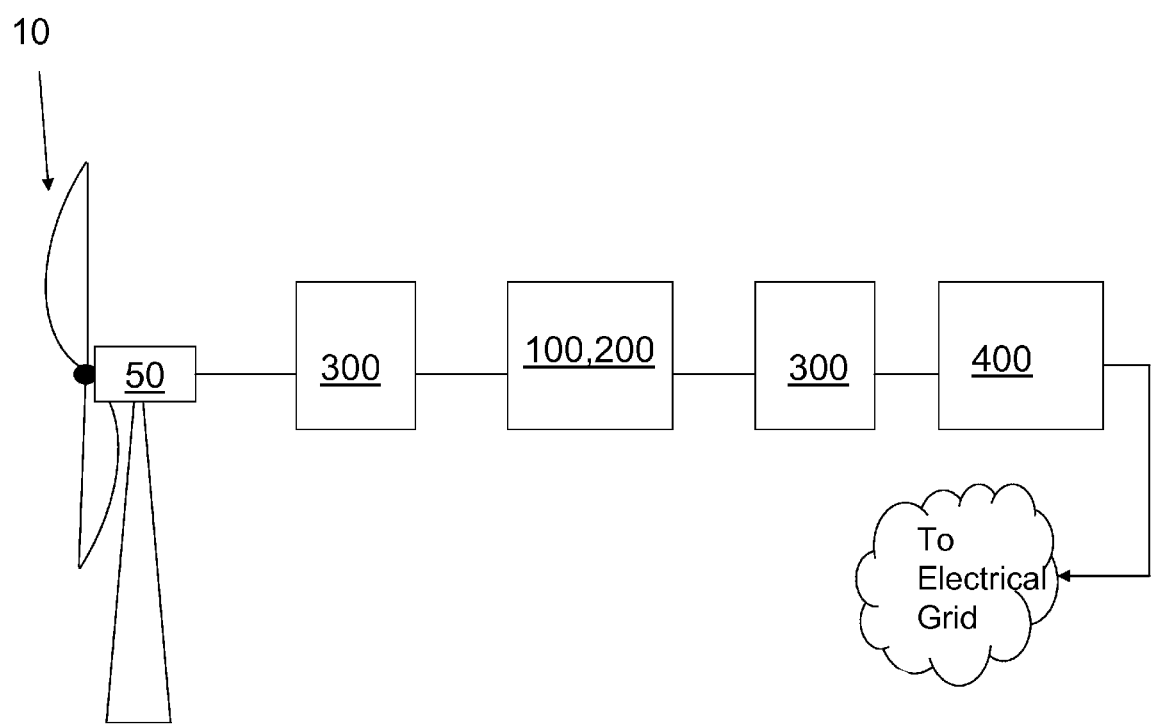
FIG. 4 shows a schematic illustration of a wind power unit according to an embodiment of the present invention.

Referring now to FIG. 4, a schematic illustration of a wind power unit according to an embodiment of the present invention is shown. Wind power unit includes at least one wind turbine 10 that includes a generator 50. Wind power unit also includes energy converter 300, such as a 3-level converter (FIG. 3) on the line side and the generator side. A transformer 400 is configured to transfer electrical energy from energy converter 300 to the electrical grid.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A circuit, comprising:
a first switch serially connected to a first discharge resistor, the first switch and the first discharge resistor directly connected to a positive direct current (DC) bus;
a second switch serially connected to a second discharge resistor, the second switch and the second discharge resistor directly connected to a negative DC bus;
a capacitor bank for storing a positive DC voltage and a negative DC voltage, the capacitor bank including a first capacitor in parallel with the first switch and the first discharge resistor, and a second capacitor in parallel with the second switch and the second discharge resistor, the first capacitor directly connected to the positive DC bus and the second capacitor directly connected to the negative DC bus;
a first sensing unit connected in parallel with the first capacitor and directly connected to the positive DC bus; and
a second sensing unit connected in parallel with the second capacitor and directly connected to the negative DC bus, wherein the first and the second sensing units are configured to measure a voltage across the first capacitor and the second capacitor, respectively, and sense an overvoltage; and
wherein, in response to a sensed overvoltage across the first capacitor, the first switch operates independently from the second switch to discharge the positive DC voltage through the first discharge resistor and, in response to a sensed overvoltage across the second capacitor, the second switch operates independently from the first switch to discharge the negative DC voltage through the second discharge resistor.

2. The circuit of claim 1, further comprising a plurality of additional switches and a plurality of additional discharge resistors, each additional switch serially connected to an additional discharge resistor, each additional switch and each additional discharge resistor connected to the positive DC bus, and in parallel with the first switch and the first discharge resistor.

3. The circuit of claim 2, further comprising a plurality of additional switches and a plurality of additional discharge resistors, each additional switch serially connected to an additional discharge resistor, each additional switch and each additional discharge resistor connected to the negative DC bus, and in parallel with the second switch and the second discharge resistor.

4. The circuit of claim 1, further comprising a plurality of diodes, wherein each diode is connected in parallel to each switch and/or each discharge resistor.

5. A power unit, comprising:
at least one energy converter;
a transformer configured to transfer electrical energy from the at least one energy converter to an electrical grid; and
a circuit coupled to the at least one energy converter, the circuit comprising:
a first switch serially connected to a first discharge resistor, the first switch and the first discharge resistor directly connected to a positive direct current (DC) bus;
a second switch serially connected to a second discharge resistor, the second switch and the second discharge resistor directly connected to a negative DC bus;
a capacitor bank for storing a positive DC voltage and a negative DC voltage, the capacitor bank including a first capacitor in parallel with the first switch and the first discharge resistor, and a second capacitor in parallel with the second switch and the second discharge resistor, the first capacitor directly connected to the positive DC bus and the second capacitor directly connected to the negative DC bus;
a first sensing unit connected in parallel with the first capacitor and directly connected to the positive DC bus; and a second sensing unit connected in parallel with the second capacitor and directly connected to the negative DC bus, wherein the first and the second sensing units are configured to measure a voltage across the first capacitor and the second capacitor, respectively, and sense an overvoltage; and wherein, in response to a sensed overvoltage across the first capacitor, the first switch operates independently from the second switch to discharge the positive DC voltage through the first discharge resistor and, in response to a sensed overvoltage across the second capacitor, the second switch operates independently from the first switch to discharge the negative DC voltage through the second discharge resistor.

6. The power unit of claim 5, wherein the circuit further comprises a plurality of additional switches and a plurality of additional discharge resistors, each additional switch serially connected to an additional discharge resistor, each additional switch and each additional discharge resistor connected to the positive DC bus, and in parallel with the first switch and the first discharge resistor.

7. The power unit of claim 6, wherein the circuit further comprises a plurality of additional switches and a plurality of additional discharge resistors, each additional switch serially connected to an additional discharge resistor, each additional switch and each additional discharge resistor connected to the negative DC bus, and in parallel with the second switch and the second discharge resistor.

8. The power unit of claim 5, wherein the circuit further comprises a plurality of diodes, wherein each diode is connected in parallel to each switch and/or each discharge resistor.

9. The power unit of claim 5, wherein the at least one energy converter is a 3-level converter.

10. A wind power unit, comprising:
at least one wind turbine that includes a generator;
at least one energy converter coupled to the generator of the at least one wind turbine;
a transformer configured to transfer electrical energy from the at least one energy converter to an electrical grid; and
a circuit coupled to the at least one energy converter, the circuit comprising:
a first switch serially connected to a first discharge resistor, the first switch and the first discharge resistor directly connected to a positive direct current (DC) bus;
a second switch serially connected to a second discharge resistor, the second switch and the second discharge resistor directly connected to a negative DC bus;
a capacitor bank for storing a positive DC voltage and a negative DC voltage, the capacitor bank including a first capacitor in parallel with the first switch and the first discharge resistor, and a second capacitor in parallel with the second switch and the second discharge resistor, the first capacitor directly connected to the positive DC bus and the second capacitor directly connected to the negative DC bus;
a first sensing unit connected in parallel with the first capacitor and directly connected to the positive DC bus; and
a second sensing unit connected in parallel with the second capacitor and directly connected to the negative DC bus, wherein the first and the second sensing units are configured to measure a voltage across the first capacitor and the second capacitor, respectively, and sense an overvoltage; and wherein, in response to a sensed overvoltage across the first capacitor, the first switch operates independently from the second switch to discharge the positive DC voltage through the first discharge resistor and, in response to a sensed overvoltage across the second capacitor, the second switch operates independently from the first switch to discharge the negative DC voltage through the second discharge resistor.

11. The wind power unit of claim 10, wherein the circuit further comprises a plurality of additional switches and a plurality of additional discharge resistors, each additional switch serially connected to an additional discharge resistor, each additional switch and each additional discharge resistor connected to the positive DC bus, and in parallel with the first switch and the first discharge resistor.

12. The wind power unit of claim 11, wherein the circuit further comprises a plurality of additional switches and a plurality of additional discharge resistors, each additional switch serially connected to an additional discharge resistor, each additional switch and each additional discharge resistor connected to the negative DC bus, and in parallel with the second switch and the second discharge resistor.

13. The wind power unit of claim 10, wherein the circuit further comprises a plurality of diodes, wherein each diode is connected in parallel to each switch and/or each discharge resistor.

14. The wind power unit of claim 10, wherein the at least one energy converter is a 3-level converter.

* * * * *